Feb. 26, 1924.                                                1,484,746
H. G. WHITE
MANUALLY CONTROLLED GUIDE FOR CULTIVATORS
Filed March 10, 1921
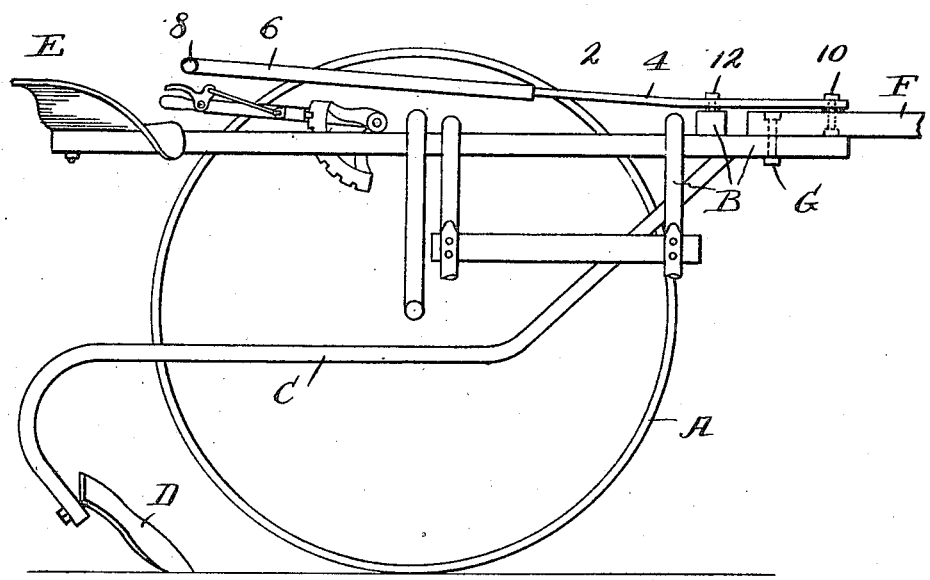
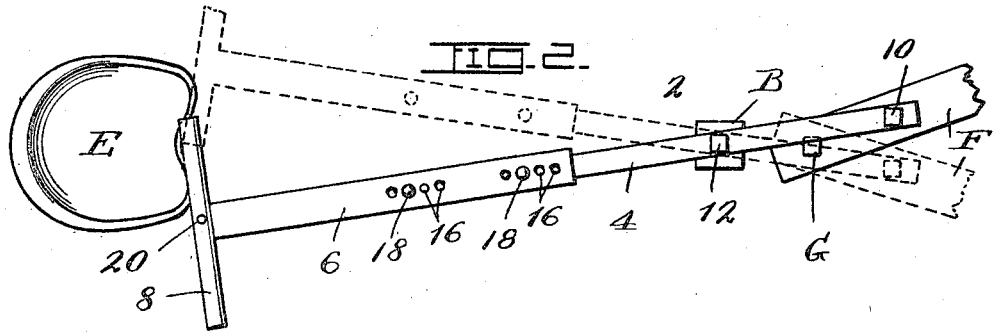
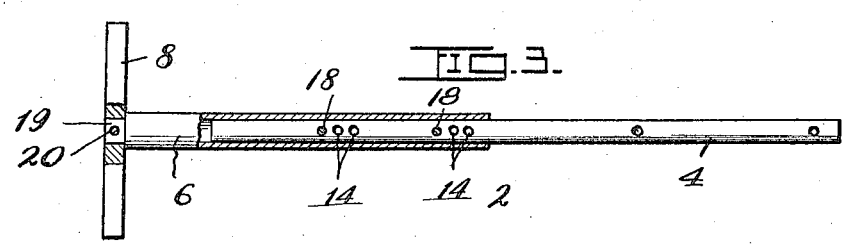
Witness:
Fred C. Fischer.
Inventor:
Hugh G. White,
By F. G. Fischer,
Attorney Patented Feb. 26, 1924.

1,484,746

UNITED STATES PATENT OFFICE.

HUGH G. WHITE, OF MALTA BEND, MISSOURI.

MANUALLY-CONTROLLED GUIDE FOR CULTIVATORS.

Application filed March 10, 1921. Serial No. 451,258.

*To all whom it may concern:*

Be it known that I, HUGH G. WHITE, a citizen of the United States, residing at Malta Bend, in the county of Saline and State of Missouri, have invented certain new and useful Improvements in Manually-Controlled Guides for Cultivators, of which the following is a specification.

My invention relates to improvements in manually controlled guides for cultivators and one object is to provide a simple device of this character which can be readily applied to one or two row cultivators for the purpose of guiding the same between rows of corn or other growing plants.

A further object is to provide a device of this character which may be lengthened or shortened to fit different cultivators.

Other objects will hereinafter appear and in order that the invention may be fully understood, reference will now be had to the accompanying drawing, in which:

Fig. 1 is a vertical sectional view of a portion of a cultivator equipped with the steering device.

Fig. 2 is a fragmentary plan view of a cultivator equipped with the device.

Fig. 3 is a detail of the device partly in section.

Like reference numerals designate similar parts throughout the several figures of the drawing. A, designates the wheels, B the frame, C the beams, D the cultivator appliances, E the seat, and F the tongue of the cultivator which is connected to the forward portion of the frame B by means of a pivot G.

2 designates the steering lever which constitutes the essential feature of the invention and consists of members 4 and 6 and a transverse handle 8.

The member 4 is connected at its forward end to the tongue F by a pivot 10 and is mounted intermediate its ends upon a fulcrum 12 secured to the upper forward portion of the frame B of the cultivator. The member 6 is, preferably, tubular in form to receive the rear portion of the member 4 upon which it is slidably mounted, so that the lever 2 may be lengthened or shortened to fit different cultivators and also increase or decrease the leverage. The members 4 and 6 are provided with a plurality of holes 14 and 16, respectively, to receive bolts 18 whereby said members 4 and 6 are reliably connected together after the lever 2 has been adjusted to the desired length.

The handle 8 is removably connected to the rear end of the member 6 by suitable means such as a tongue 19 on said member 6 and a bolt 20, which latter passes through the handle 8 and said tongue 19. The handle 8 is arranged transversely, to the member 6, so that the driver may grasp said handle 8 with both hands and thus obtain a firm grip for steering the cultivator. By detachably connecting the members 4 and 6 with the bolts 18, and the handle 8 with the bolt 20 the steering lever 2 can be taken apart and conveniently packed for shipment and in case one of the parts becomes broken it can be replaced at relatively small cost.

By equipping cultivators with my steering device as above described it is obvious that the driver can readily follow the rows of plants and avoid obstacles by moving the lever 2 to one side or the other as shown by full and dotted line, Fig. 2, and hence recourse need not be had to the arduous work of attempting to steer the cultivator by forcing the plows or shovels of one gang deeper into the soil than those of the companion gang.

While I have shown the device connected to the tongue F to accomplish the steering of the cultivator, I do not restrict myself to this specific arrangement, as by making slight modifications the steering device can be readily applied to cultivators in which the wheels are mounted on swivel connections to coact in steering the cultivator.

Having thus described my invention, what I claim and desire to secure by Letters Patent, is:

In combination with a wheeled cultivator having a pivoted tongue and a driver's seat, a steering lever fulcrumed on the cultivator frame and consisting of a member fulcrumed on the cultivator frame and pivoted at its forward end to the tongue, a tubular member operably mounted upon the rear portion of the first-mentioned member, means for securing said tubular member at any point of its adjustment, and a handle connected to the rear portion of the tubular member within convenient reach of the driver's seat and projecting in opposite directions from said tubular member.

In testimony whereof I affix my signature in the presence of two witnesses.

HUGH G. WHITE.

Witnesses:
   LEVI KRAMER,
   GEORGE W. HACKLEY.